US011582335B2

(12) United States Patent
Puttick et al.

(10) Patent No.: US 11,582,335 B2
(45) Date of Patent: Feb. 14, 2023

(54) MESSAGE RECORDING SYSTEM FOR BROADCAST INTERCOMS

(71) Applicant: Robert Bosch GmbH, Stuttgart (DE)

(72) Inventors: James Puttick, Scarborough (CA); Shawn Anderson, Elysian, MN (US); Timothy Mueggenberg, Coon Rapids, MN (US); Sean McKinnon, Newmarket (CA)

(73) Assignee: Robert Bosch GmbH, Stuttgart (DE)

(*) Notice: Subject to any disclaimer, the term of this patent is extended or adjusted under 35 U.S.C. 154(b) by 280 days.

(21) Appl. No.: 16/079,710

(22) PCT Filed: Feb. 23, 2017

(86) PCT No.: PCT/EP2017/054107
§ 371 (c)(1),
(2) Date: Aug. 24, 2018

(87) PCT Pub. No.: WO2017/144557
PCT Pub. Date: Aug. 31, 2017

(65) Prior Publication Data
US 2019/0052743 A1 Feb. 14, 2019

Related U.S. Application Data

(60) Provisional application No. 62/299,439, filed on Feb. 24, 2016.

(51) Int. Cl.
*H04M 1/64* (2006.01)
*H04M 1/65* (2006.01)
(Continued)

(52) U.S. Cl.
CPC ............... *H04M 1/65* (2013.01); *H04M 9/00* (2013.01); *H04M 9/001* (2013.01); *H04M 11/025* (2013.01)

(58) Field of Classification Search
CPC .......... H04M 1/65; H04M 9/00; H04M 9/001; H04M 11/025
(Continued)

(56) References Cited

U.S. PATENT DOCUMENTS

| 5,717,742 A | 2/1998 | Hyde-Thomson |
| 5,956,389 A | 9/1999 | Jung |
| 6,389,276 B1 | 5/2002 | Brilla et al. |
| 7,567,659 B2 | 7/2009 | Kumagai |

(Continued)

FOREIGN PATENT DOCUMENTS

| CA | 2547828 A1 | 11/2006 |
| CN | 1798185 A | 7/2006 |
| CN | 101651733 A | 2/2010 |

OTHER PUBLICATIONS

International Search Report corresponding to PCT Application No. PCT/EP2017/054107, dated May 12, 2017 (4 pages).

(Continued)

*Primary Examiner* — Md S Elahee
(74) *Attorney, Agent, or Firm* — Michael Best & Friedrich LLP

(57) ABSTRACT

An intercom device and a method of recording an audio stream at the intercom device. The intercom device includes a user interface, a memory, and an electronic processor. The electronic processor is communicatively coupled to the user interface and the memory and is configured to receive a user-selectable entry from an input mechanism of the user interface. The electronic processor sets an away mode of the intercom device in response to the user-selectable entry. An audio stream is received by the intercom device from another intercom device. Are cord signal indicative of a request to record the audio stream is also received from the another intercom device. The intercom device records the (Continued)

audio stream in the memory in response to receiving the record signal when operating in the away mode.

20 Claims, 8 Drawing Sheets

(51) Int. Cl.
*H04M 11/02* (2006.01)
*H04M 9/00* (2006.01)

(58) Field of Classification Search
USPC .............................................. 379/67.1, 88.22
See application file for complete search history.

(56) References Cited

U.S. PATENT DOCUMENTS

| | | | |
|---|---|---|---|
| 8,189,748 B2 | 5/2012 | Susama et al. | |
| 8,660,249 B2 | 2/2014 | Rondeau et al. | |
| 8,781,084 B2 | 7/2014 | Reyes et al. | |
| 2003/0149774 A1 | 8/2003 | McConnell et al. | |
| 2005/0238148 A1 | 10/2005 | Poustchi et al. | |
| 2008/0069318 A1 | 3/2008 | McClung | |
| 2008/0207177 A1 | 8/2008 | Shukla | |

OTHER PUBLICATIONS

Brico, Manuel, "Integration Von Digitalen Intercom—Systemen in Vorhandene Strukturen", Fkt Fernseh Und Kinotechnik, Fachverlag Schiele & Schon Gmbh., Berlin, DE, Jan. 1, 2005, XP001244808—ISSN 1430-9947, pp. 99-101, available at https://www.fktg.org/integration-von-digitalen-intercom-systemen-vorhandene-strukturen.

Waiwright, J., "Technik, Design Und Architectur Von Intercom-Systemene", Fkt Fernseh Und Kinotechnik, Fachverlag Schiele & Schon Gmbh., Berlin, DE, Jan. 1, 2005, XP001244806—ISSN 1430-9947, pp. 90-94, available at https://www.fktg.org/technik-design-und-architektur-von-intercom-systemen.

First Office Action from the National Intellectual Property Administration, P.R. China for Application No. 201780012960.1 dated Mar. 3, 2020 (16 pages).

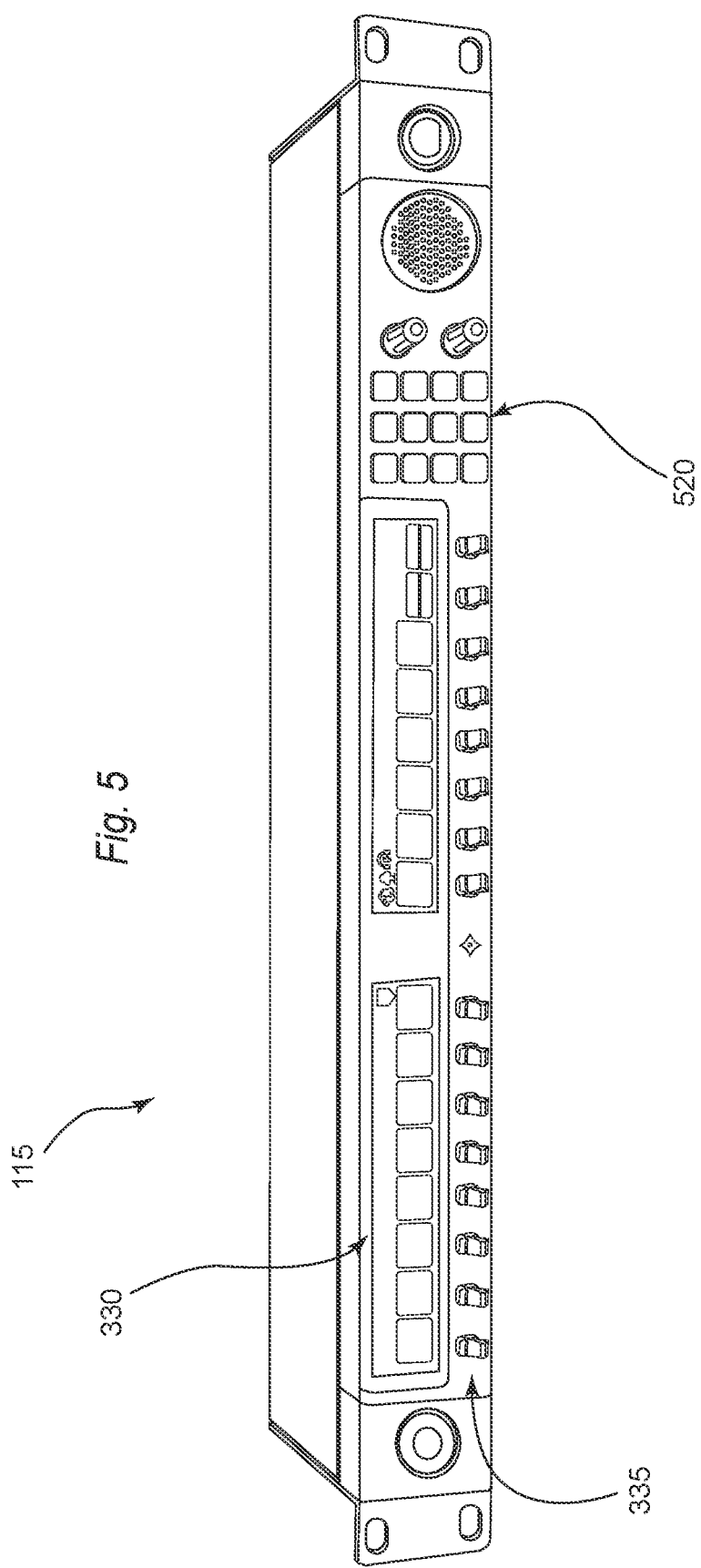

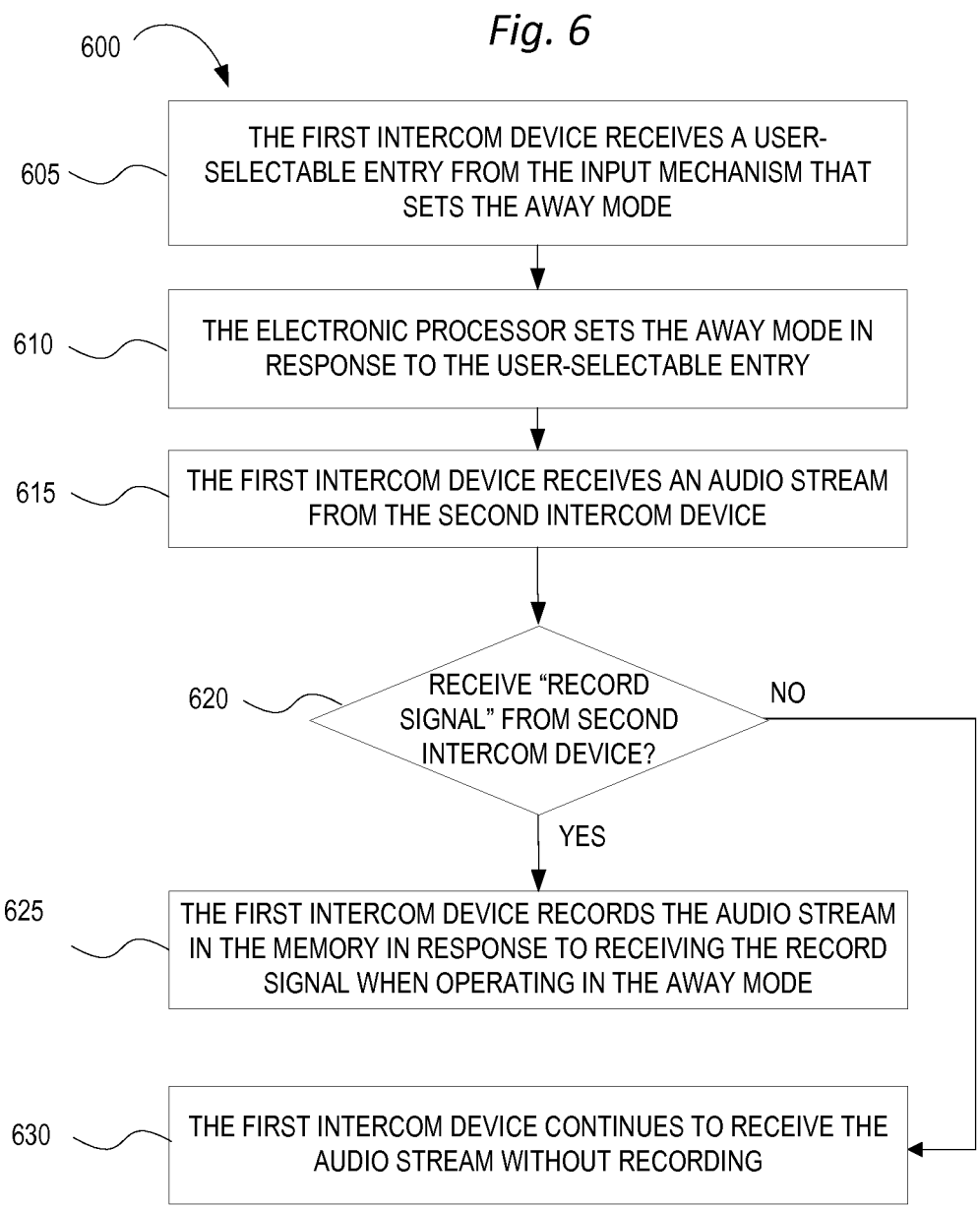

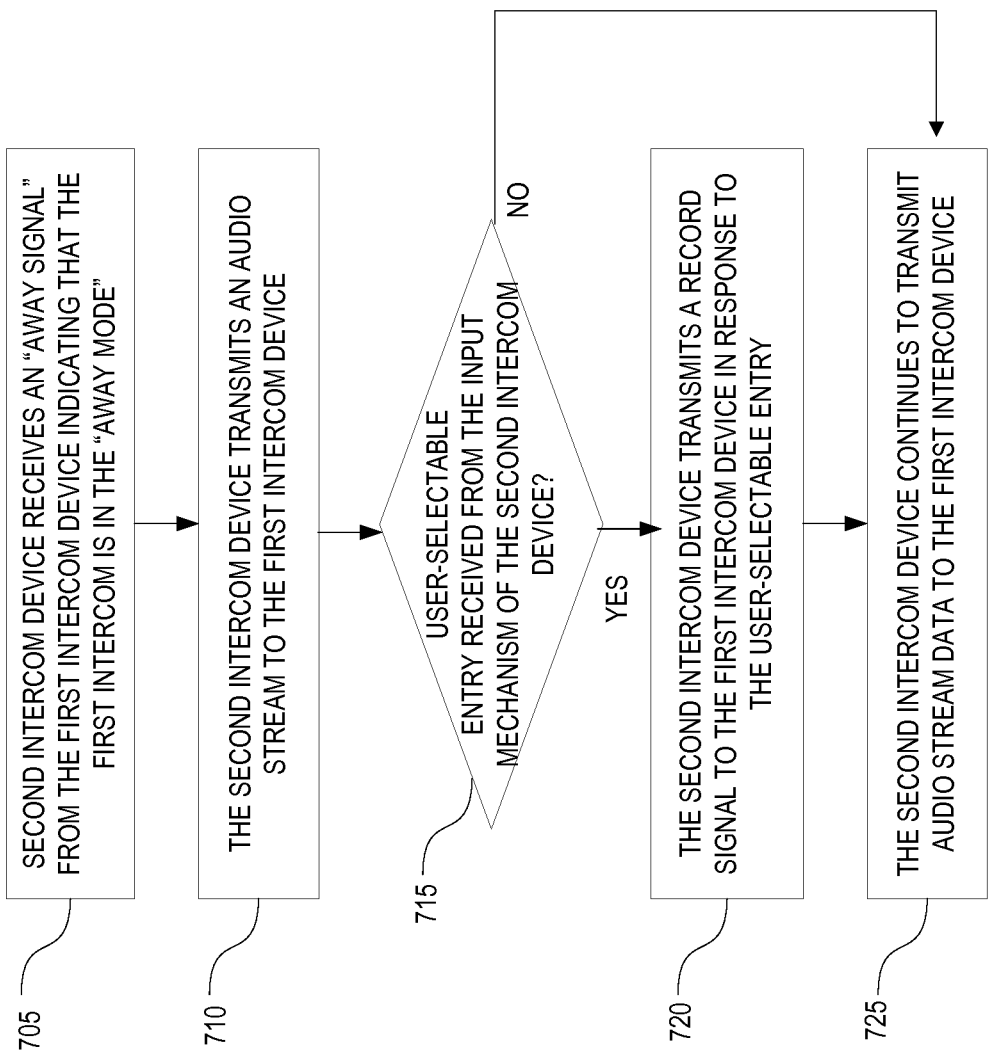

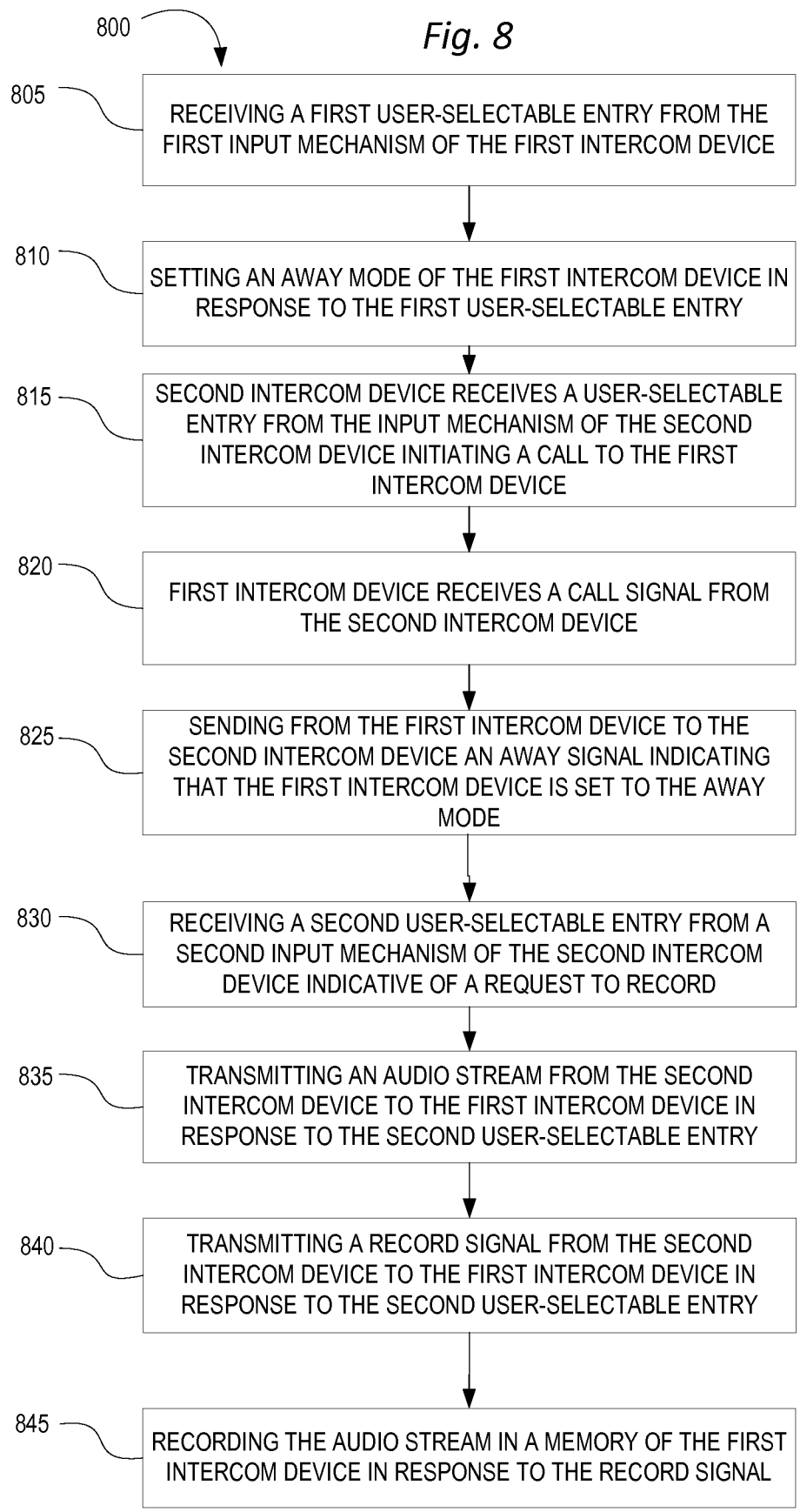

MESSAGE RECORDING SYSTEM FOR BROADCAST INTERCOMS

RELATED APPLICATIONS

The present application is a 35 U.S.C. § 371 National Stage Application of PCT/EP2017/054107, filed on Feb. 23, 2017, which claims the benefit of priority to U.S. Provisional Application No. 62/299,439, filed on Feb. 24, 2016, the entire contents of which are incorporated herein by reference.

BACKGROUND

Embodiments of the present invention relate to intercom systems, intercom devices, and their methods of operation.

SUMMARY

Various embodiments provide one or more intercom devices for an intercom system and a method of operating the intercom devices. The intercom devices include, among other things, a user interface and a controller. The user interface includes a microphone, a speaker, an input mechanism, and a display. The intercom devices are configured to receive, play, and record an audio stream in real time from other intercom devices. The intercom devices are configured to enter into an away mode based on a user-selectable entry on the user interface. When receiving an audio stream while in the away mode, the controller records the audio stream in response to a record signal sent from another intercom device. The controller may then generate an indication on the display that the audio stream has been recorded.

One embodiment provides an intercom device for recording an audio stream. The intercom device includes a user interface, a memory, and an electronic processor. The electronic processor is communicatively coupled to the user interface and the memory and is configured to receive a user-selectable entry from an input mechanism of the user interface. The electronic processor sets an away mode of the intercom device in response to the user-selectable entry. An audio stream is received by the intercom device from another intercom device. A record signal indicative of a request to record the audio stream is also received from the another intercom device. The intercom device records the audio stream in the memory in response to receiving the record signal when operating in the away mode.

Another embodiment provides an intercom device for transmitting an audio stream. The intercom device includes a user interface, a memory, and an electronic processor communicatively coupled to the user interface and the memory. The electronic processor is configured to transmit an audio stream to another intercom device and to receive an away signal from the another intercom device indicating that the another intercom device is in an away mode. The electronic processor receives a user-selectable entry from an input mechanism of the user interface and transmits a record signal to the another intercom device in response to the user-selectable entry that causes the another intercom device to record the audio stream.

Yet another embodiment provides a method of recording an audio stream at a first intercom device that is transmitted by a second intercom device. The method includes receiving a first user-selectable entry from a first input mechanism of the first intercom device. In response to the first user-selectable entry, an away mode of the first intercom device is set. A call signal is received from a second intercom device that initiates a call to the first intercom device. The first intercom device sends an away signal to the second intercom device indicating that the first intercom device is set to the away mode. A second user-selectable entry is received from a second input mechanism of the second intercom device. The second intercom device transmits an audio stream to the first intercom device in response to the second user-selectable entry. The second intercom device also transmits a record signal to the first intercom device in response to the second user-selectable entry. The record signal causes the first intercom device to record the audio stream. The first intercom device then records the audio stream in a memory of the first intercom device in response to the record signal.

Other aspects of the invention will become apparent by consideration of the detailed description and accompanying drawings.

BRIEF DESCRIPTION OF THE DRAWINGS

FIG. 5 is a perspective view of the first intercom device and the second intercom device of FIGS. 3 and 4.

FIG. 6 is a flowchart of a method of receiving an audio stream at the first intercom device of FIG. 3 according to one embodiment.

FIG. 7 is a flowchart of a method of transmitting an audio stream from the second intercom device of FIG. 4 according to one embodiment.

FIG. 8 is a flowchart of a method of recording an audio stream at the first intercom device of FIG. 3 and transmitted from the second intercom device of FIG. 4 according to one embodiment.

DETAILED DESCRIPTION

Before any embodiments are explained in detail, it is to be understood that embodiments are not limited in their application to the details of construction and the arrangement of components set forth in the following description or illustrated in the following drawings. Embodiments are capable of being practiced or carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, aspects of the invention may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, and various connections (e.g., a system bus) connecting the components.

Figure 1:
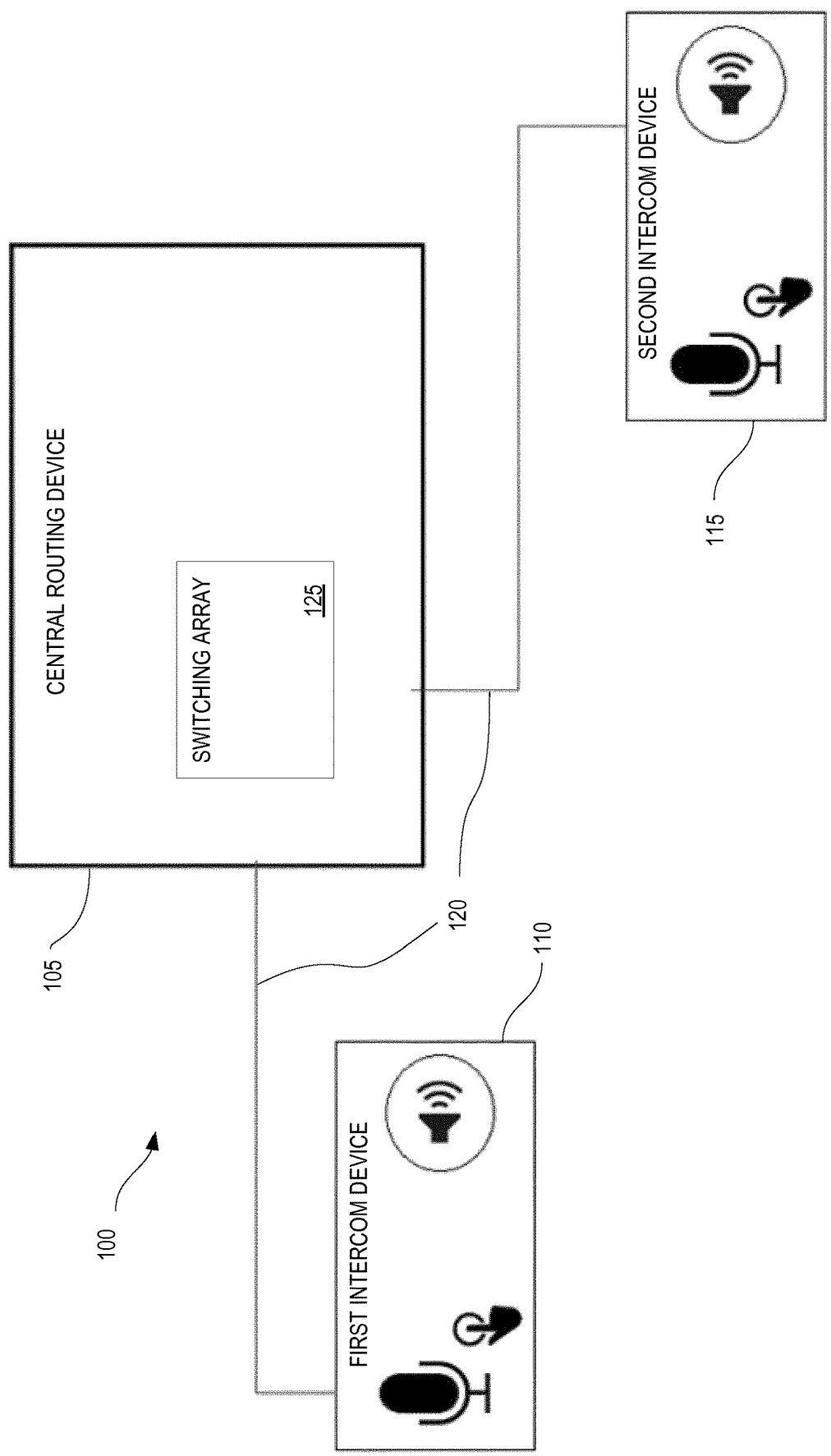
FIG. 1 is a block diagram of an intercom system including a central routing device according to one embodiment.

FIG. 1 illustrates an intercom system 100 according to an embodiment of the invention. In the example illustrated, the intercom system 100 includes a central routing device 105, a first intercom device 110, and a second intercom device 115. The central routing device 105 is communicatively coupled to the first intercom device 110 and the second intercom device 115. The central routing device 105 is communicatively coupled between the first intercom device 110 and the second intercom device 115 via one or more communication links 120 (for example, a local area network). The communication links 120 may include Ethernet, high-quality audio over Internet Protocol (IP), Voice over Internet Protocol (VoIP), analog audio, or a combination of the foregoing. The communication links 120 may include an audio channel for transmitting audio streams and a control channel for transmitting control signals. The control channel may transmit routing information, away indications, and requests for recording of audio streams. The audio channel and the control channel may operate in a full-duplex or half-duplex modes. The intercom system 100 may include additional intercom devices communicatively coupled through the central routing device 105 in, for example, a star network configuration.

The central routing device 105 includes hardware, software, or both that communicatively couples the first intercom device 110 to the second intercom device 115. In some embodiments, the central routing device 105 may include a switching array 125 with at least one controllable switch to link the first intercom device 110 to the second intercom device 115. In these embodiments, the central routing device 105 coordinates communications between the intercom devices via the switching array 125 based on the control signals from the intercom devices. For example, the central routing device 105 may receive a control signal from the first intercom device 110 to send an audio stream to the second intercom device 115. In this example, the first intercom device 110 may send addressing information (e.g., a unique identification number of the second intercom device 115) in the control message to the central routing device 105 and thereby call the second intercom device 115. When receiving the control signal, the central routing device 105 communicatively links the first intercom device 110 to the second intercom device 115. In some embodiments, the central routing device 105 links multiple intercom devices simultaneously over the same audio channel or separate audio channels based on control signals from the intercom devices and internal programming.

Figure 2:
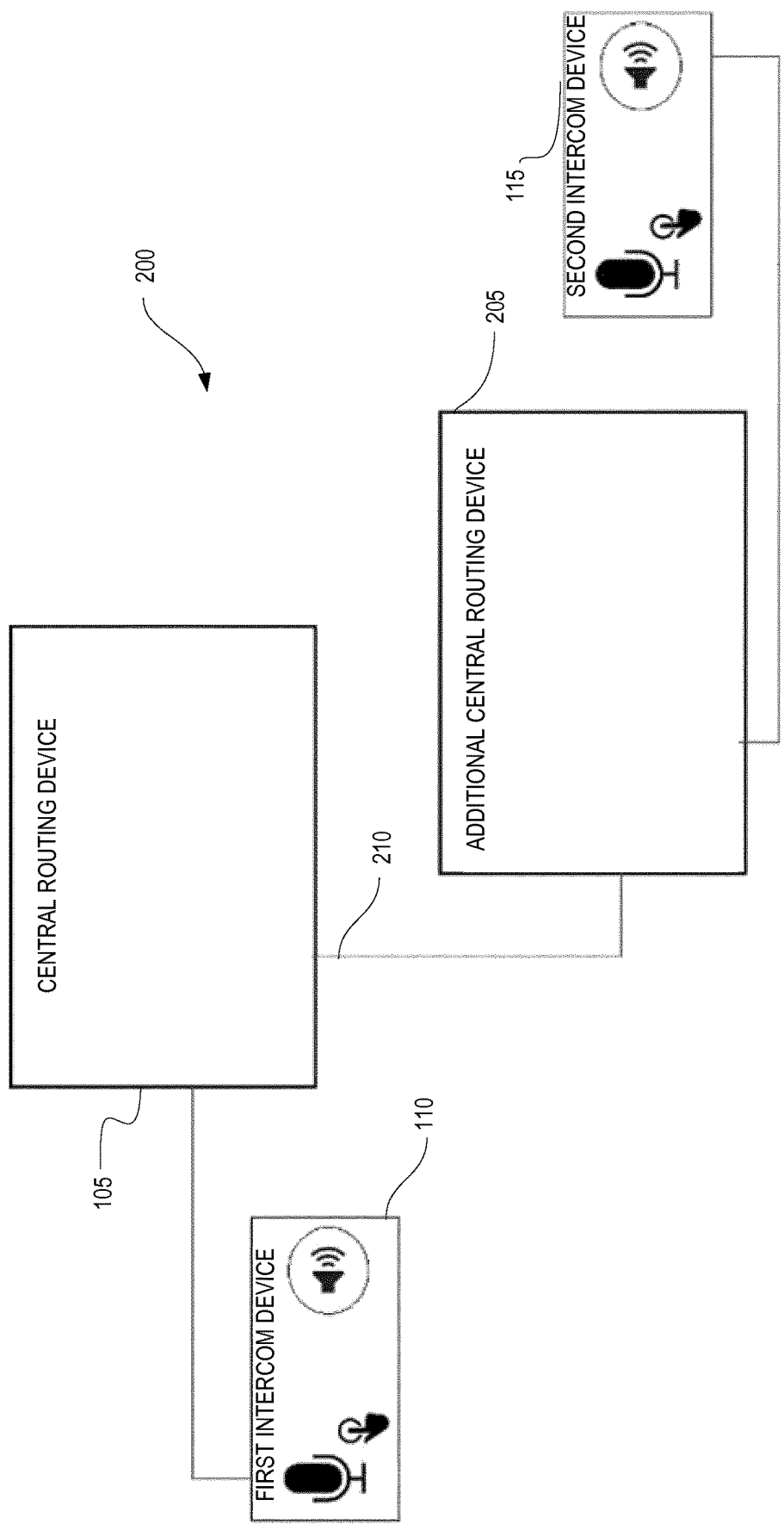
FIG. 2 is a block diagram of another intercom system including an additional routing device according to one embodiment.

In another example, an intercom system 200 is illustrated in FIG. 2. The intercom system 200 may include all the features, components, connections, and capabilities of the intercom system 100. However, in addition, the intercom system 200 may include one or more additional routing devices. In the example illustrated, the intercom system 200 includes an additional routing device 205. In this embodiment, the central routing device 105 and the additional routing device 205 are communicatively coupled via a trunked link 210. The trunked link 210 may be configured to transmit audio, voice, and control signals between the central routing device 105 and the additional routing device 205. The central routing device 105 and the additional routing device 205 may each be part of separate independent intercom networks that are only connected by the trunked link 210. The intercom system 200 may contain additional routing devices, each communicatively coupled via additional trunked links. As a consequence, the intercom system 200 may provide communication among multiple, independent intercom systems by linking each of the intercom systems together.

In other embodiments, the intercom system 100 does not rely on the central routing device 105 to establish communication among intercom devices. In these embodiments, the first intercom device 110 is directly coupled to the second intercom device 115 with a direct communication link. For example, the first intercom device 110 may be directly coupled (for example, with no intervening control switching) to the second intercom device 115. In this configuration, additional user interfaces may be coupled to the first intercom device 110 and the second intercom device 115 in the same manner. In some embodiments, the intercom system 100 may include both the central routing device 105 and direct communication links between intercom devices.

Figure 3:
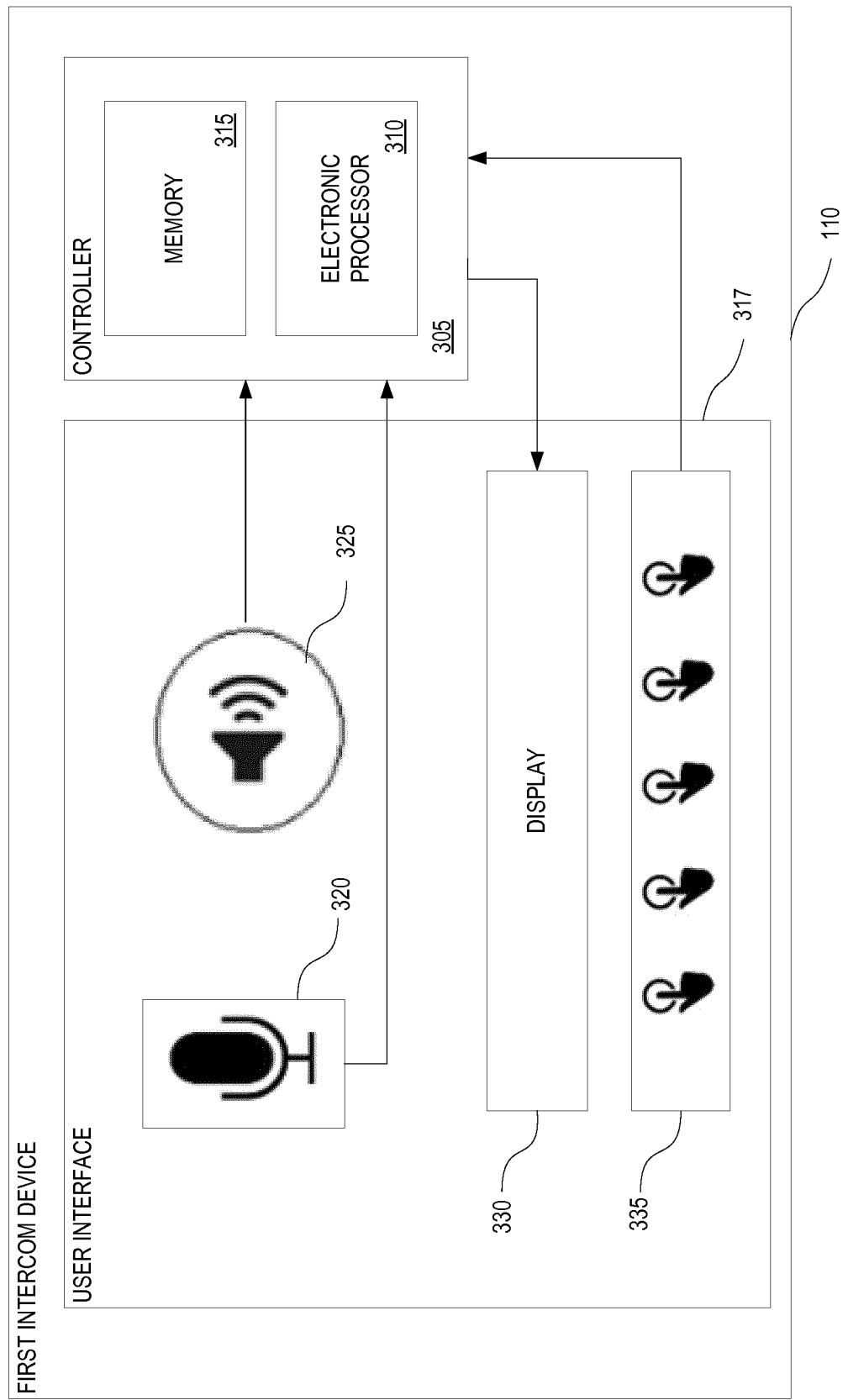
FIG. 3 is a block diagram of an example construction of a first intercom device of the intercom systems of FIGS. 1 and 2 according to one embodiment.

FIG. 3 illustrates one example construction of the first intercom device 110. In the example illustrated, the first intercom device 110 includes a plurality of electrical and electronic components that provide power, operational control, and protection to the components and modules within the first intercom device 110. The first intercom device 110 includes a controller 305, which further includes an electronic processor 310 (e.g., a programmable electronic microprocessor, microcontroller, or similar device) and a memory 315 (e.g., non-transitory, machine-readable memory). The electronic processor 310 is communicatively coupled to the memory 315 and executes instructions stored on the memory 315. The electronic processor 310 is configured to retrieve from memory 315 and execute, among other things, instructions related to the control processes and methods described herein. In other embodiments, the first intercom device 110 includes additional, fewer, or different components.

In the illustrated embodiment, the first intercom device 110 also includes a user interface 317. The user interface 317 includes a microphone 320, a speaker 325, a display 330, and an input mechanism 335. The microphone 320 and the speaker 325 may be constructed in various configurations. For example, the speaker 325 and the microphone 320 may be integrated into a single headset or may be separate stand-alone components. The speaker 325, the microphone 320, the display 330, and the input mechanism 335 are electrically coupled with the controller 305 and provide input and output functionality for a user of the first intercom device 110. In some embodiments, the first intercom device 110 generates an audio stream (for example, a voice message) from the microphone 320. In other embodiments, an audio stream may be generated by other sources and received by the first intercom device 110. An audio stream may also be stored in the memory 315. User-selectable entries from the input mechanism 335 selects and directs transmission and reception of audio streams for the first intercom device 110 as described below.

The input mechanism 335 may have multiple inputs including multiple buttons, switches, toggles, and the like. Each of these inputs may activate communication with one or more particular intercom devices. When one of the inputs of the input mechanism 335 is activated (e.g., by depressing, toggling, holding, and the like), the controller 305 selects a particular intercom device selected by the activated input for communication, and may send addressing information associated with the selected intercom device to the central routing device 105. The central routing device 105 may then activate a communication link between the first intercom device 110 and the selected intercom device. The first intercom device 110 may be preconfigured with an address of each particular intercom device that is associated with each particular input.

Figure 4:
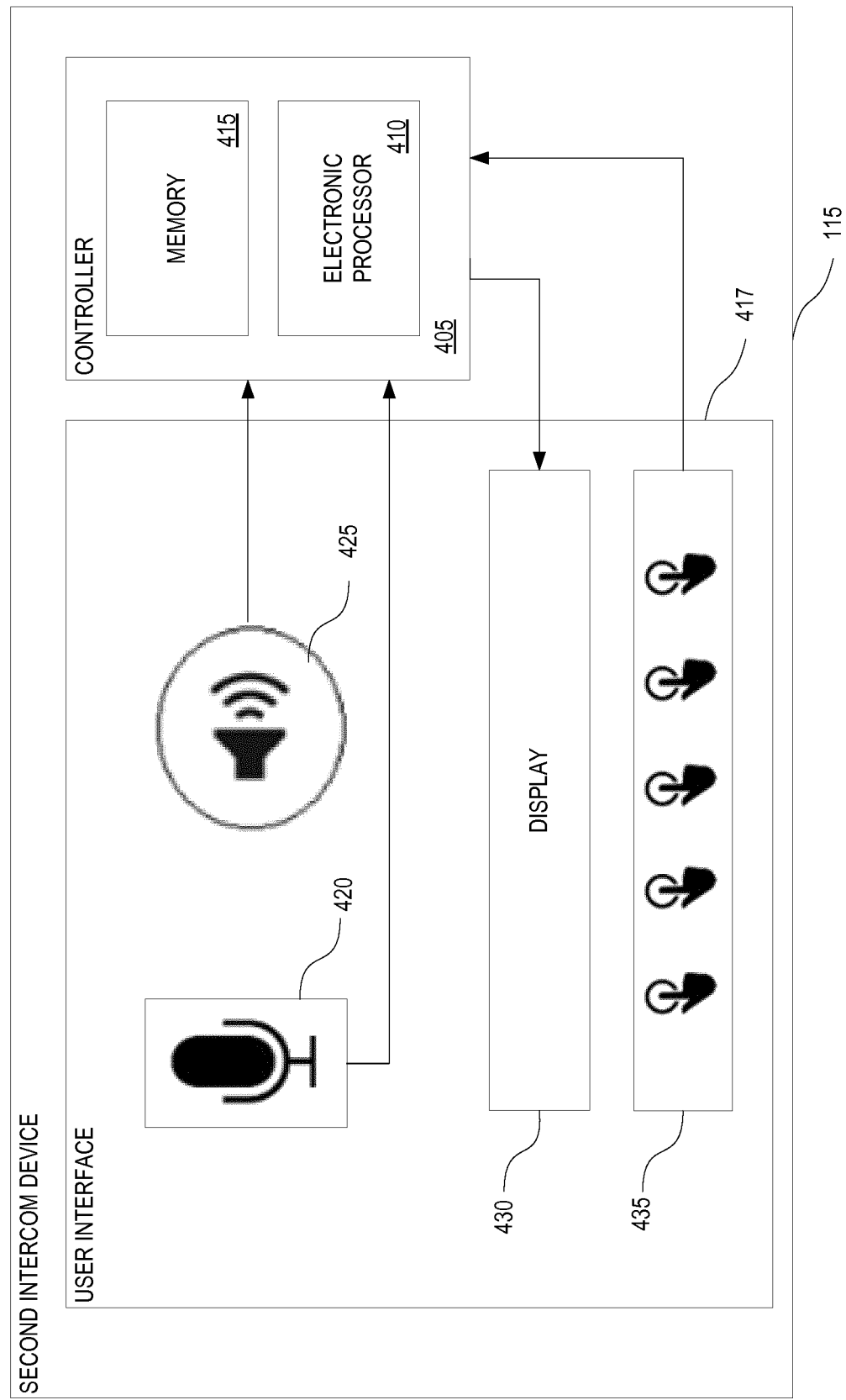
FIG. 4 is a block diagram of an example construction of a second intercom device of the intercom systems of FIGS. 1 and 2 according to one embodiment.

FIG. 4 illustrates one example construction of the second intercom device 115. It should be noted that the second intercom device 115 may be identical in construction, components, and capabilities as the first intercom device 110 or may differ various aspects. In the example illustrated, the second intercom device 115 includes a controller 405, which further includes an electronic processor 410 (e.g., a programmable electronic microprocessor, microcontroller, or similar device) and a memory 415 (e.g., non-transitory, machine-readable memory). The second intercom device 115 includes a user interface 417. The user interface 417 includes a microphone 420, a speaker 425, a display 430, and an input mechanism 435. These components of the second intercom device 115 may be configured and may function as the corresponding components of the first intercom device 110 as described above.

FIG. 5 illustrates a perspective view of the first intercom device 110 and the second intercom device 115 according to one embodiment. In the example illustrated, the input mechanism 335, 435 includes a plurality of inputs each associated with a particular channel (for example, each channel is communicatively coupled with another intercom device) positioned below the display 330, 430. The input mechanism 335, 435 includes a plurality of multi-position switches (for example, a three- or five-position switch). The multi-position switches may have two positions corresponding to transmitting and receiving functions, two positions for volume adjustment of the associated channel, and a neutral position. The input mechanism 335, 435 may interact with another button 520 (for example, a shift, alt, or control button) to provide different and additional functions including sending a record signal to the intercom device that is selected by a particular multi-position switch. When a particular multi-position switch is set to transmit, the controller 305, 405 sends the address of the intercom device associated with that multi-position switch to the central routing device 105. Then, the controller 305, 405 may transmit an audio stream to the intercom device selected by the multi-position switch. On activation of the another button 520 along with setting the multi-position switch to transmit, the controller 305, 405 may simultaneously transmit a record signal along with the audio stream. In this case, the first intercom device 110 or the second intercom device 115 is configured to simultaneously receive one entry selecting another intercom device and another entry selecting the request to record the audio stream during transmission of the audio stream. In other embodiments, a record signal may be transmitted prior to or subsequent to transmission of an audio stream.

The display 330, 430 may include a graphical user interface that indicates, among other things, status information and associations of each of the inputs of the input mechanism 335, 435. The status information may include whether the first intercom device 110, the second intercom device 115, or both are in an away mode or in an active mode. The status information may also include whether any audio streams have been recorded by the controller 305 and from which other intercom device that the audio stream was received. An icon indicating a recorded audio stream may be displayed and positioned above a particular input, thus indicating that an audio stream has been received from the intercom device associated with that input. For example, the second intercom device 115 may send an audio stream to the first intercom device 110 when the first intercom device 110 is set to the away mode. In this example, the first intercom device 110 stores the audio stream in the memory 315 when it receives a record signal and displays an icon indicative of the recorded audio stream on a portion of the display 330. The icon may be displayed adjacent to the multi-position switch associated with the second intercom device 115, thus indicating that the audio stream originated from the second intercom device 115. Additionally, in this example, when the first intercom device 110 is in the away mode, the second intercom device 115 may display an icon on the display of the second intercom device 115 indicating that the first intercom device 110 is in the away mode.

FIG. 6 illustrates a method 600 of receiving an audio stream with the first intercom device 110 according to one embodiment. In this embodiment, the first intercom device 110 receives a user-selectable entry from the input mechanism 335 to activate the away mode (block 605). The electronic processor 310 sets the away mode in response to the user-selectable entry (block 610). The first intercom device 110 receives an audio stream from the second intercom device 115 (block 615). While operating in the away mode, the first intercom device 110 may receive a "Record Signal" from the second intercom device indicative of a request to record the audio stream from the second intercom device 115. When the first intercom device 110 receives a "Record Signal" from the second intercom device 115 while operating in the away mode (block 620), the first intercom device 110 records the incoming audio stream from the second intercom device 115 in the memory 315 in response to receiving the record signal (block 625). However, if the record signal is not received (block 620), then the first intercom device 110 will continue to receive the audio stream data from the second intercom device 115 without recording the incoming audio stream (block 630).

FIG. 7 illustrates a method 700 of operating a second intercom device 115 interacting with the first intercom device 110. In this embodiment, the second intercom device 115 receives an "away signal" from the first intercom device 110 indicating that the first intercom device 110 is operating in the "away mode" (block 705) as discussed above in reference to FIG. 6. The second intercom device 115 transmits an audio stream to the first intercom device 110 (block 710). Even though the first intercom device 110 is operating in the "away mode," the second intercom device 115 is able to continue to send audio stream data to the first intercom device 110. Furthermore, the second intercom device 115 monitors the input mechanism 435 for a user-selectable entry (block 715). When the input mechanism 435 is activated—indicating that a user of the second intercom device 115 intends to have audio stream data sent by the second intercom device 115 recorded by the first intercom device 110—the second intercom device 115 transmits a "record signal" to the first intercom device 110 in response to the user-selectable entry (block 720). The second intercom device 115 then continues to transmit audio stream data to the first intercom device 110 (block 725) and, as discussed above in reference to FIG. 6, the first intercom device 110 will record the received audio stream data to its memory after receiving the "record signal" from the second intercom device 115 while the first intercom device 110 is operating in the away mode. Conversely, if the input mechanism 435 has not been activated (at block 715), then the second intercom device 115, in this example, can continue to transmit audio stream data to the first intercom device 110

(at block 725), but will not transmit the "record signal" and, accordingly, the first intercom device 110 will not record the incoming audio stream.

FIG. 8 illustrates an example 800 of initiating a recording of an audio stream at the first intercom device 110 according to one embodiment. In this example, a first user-selectable entry from the input mechanism 335 of the first intercom device 110 (block 805) and, in response, an away mode of the first intercom device 110 is set by the controller 305 (block 810). The second intercom device 115 receives a user-selectable entry from the input mechanism 435 of the second intercom device 115 initiating a call from the second intercom device 115 to the first intercom device 110 (block 815). A call signal is received by the first intercom device 110 from the second intercom device 115 (block 820) and, because the first intercom device 110 is operating in the away mode, an away signal is sent from the first intercom device 110 to the second intercom device 115 (block 825). As discussed above, the second intercom device 115 is able to transmit audio stream data to the first intercom device 110 while the first intercom device 110 is operating in the away mode. However, the second intercom device 115 can also selectively cause the first intercom device 110 to record the audio stream, in response to a user-selectable entry is received from the input mechanism 435 of the second intercom device 115 (block 830). The audio stream is transmitted from the second intercom device 115 to the first intercom device 110 (block 835) and a record signal is also transmitted from the second intercom device 115 to the first intercom device 110 in response to the second user-selectable entry (block 840). The record signal causes the first intercom device 110 to record the audio stream in the memory 315 of the first intercom device 110 in response to the record signal (block 845).

It should be noted that the steps of the methods 600, 700, and 800 do not necessarily need to be performed in the order listed. In some embodiments, the communication signals between the intercom devices happen in alternative orders. For example, in some embodiments, a call signal is transmitted prior to the audio stream. In other embodiments, the audio stream with or without a record signal itself initiates communication with the receiving intercom device.

The first intercom device 110 may be set to an active mode or an away mode with an input from the input mechanism 335. In some embodiments, prior to receiving the audio stream, the first intercom device 110 receives a call signal from the second intercom device 115 (for example, when the multi-position switch associated with the first intercom device 110 on the second intercom device 115 is set to transmit). When the call signal is received, the first intercom device 110 transmits an away signal to the second intercom device 115 indicative of the away mode of the first intercom device 110. When the away signal is received, the second intercom device 115 may generate an indication of the away mode of the first intercom device 110 on the display 430 of the second intercom device 115. This indication may include a visual indicator (for example, an icon or light), an audio indication (for example, a chime or beep), and the like. When the indication is received, the second intercom device 115 may receive an user-selectable entry on the user interface instructing the second intercom device 115 to transmit a record signal to the first intercom device 110.

In other embodiments, when in the active mode (i.e., not in the away mode), the first intercom device 110, upon receiving an audio stream, automatically plays the audio stream over the speaker 325. In this case, the second intercom device 115 does not send a call signal to the first intercom device 110, but rather, immediately sends the audio stream to the first intercom device 110. The first intercom device 110 may automatically mute the audio stream when the first intercom device 110 is in the away mode and receives the audio stream.

In yet other embodiments, when the first intercom device 110 receives a call signal or an audio stream, the first intercom device 110 may display an indication that a transmission from the second intercom device 115 is incoming. In this case, one of the multi-position switches must be switched to "receive" before the audio stream is played.

In some embodiments, the first intercom device 110 and the second intercom device 115 may include a call-back feature. For example, after receiving and recording an audio stream from the second intercom device 115, the first intercom device 110 may initiate a new audio stream, which may include a voice message, upon selection of a single button (for example, a call-back button or call-waiting key) on the user interface 317. The new audio stream is transmitted to the second intercom device 115 without requiring selection of the transmit button. The call-back button, when depressed, directs the controller 305 to record the new audio stream. When the call-back back is released, the controller 305 may then transmit the new audio stream to the second intercom device 115.

In some embodiments, the first intercom device 110 includes a dynamical isolate feature. Since the first intercom device 110 may receive multiple audio streams simultaneously, from multiple other intercom devices, the controller 305 may dynamically isolate one of the multiple input streams. For example, when the first intercom device 110 starts recording an audio stream based on a record signal, the controller 305 may mute or otherwise suppress other incoming audio streams until the message has been recorded. This prevents the other incoming audio streams from interfering with recording of the first audio stream.

Thus, the invention provides, among other things, an intercom system and a method of recording and transmitting audio streams among intercom devices. The intercom devices may enter into an away mode, respond to other intercom devices with an away signal, and record audio streams in response to a record signal from other intercom devices. Further aspects of the invention are described in the following claims.

What is claimed is:

1. An intercom device for recording an audio stream, the intercom device comprising:
   a user interface including an input mechanism;
   a memory; and
   an electronic processor communicatively coupled to the user interface and the memory, the electronic processor configured to receive a user-selectable entry from the input mechanism;
   set an away mode of the intercom device in response to the user-selectable entry;
   send the away signal indicative of the away mode to the another intercom;
   receive an audio stream from another intercom device;
   receive a record signal indicative of a request to record the audio stream from the another intercom device; and
   record the audio stream in the memory in response to receiving the record signal when operating in the away mode.

2. The intercom device according to claim 1, wherein the electronic processor is further configured to receive a call signal from the another intercom device prior to receiving the audio stream, the call signal initiating communication with the intercom device.

3. The intercom device according to claim 2, wherein the electronic processor is further configured to send the away signal indicative of the away mode to the another intercom device when the away mode is set and the call signal is received.

4. The intercom device according to claim 1, wherein the electronic processor is further configured to send the away signal by broadcast of the away signal to other intercom devices indicating that the intercom device is in the away mode prior to receiving an audio stream from another intercom device.

5. The intercom device according to claim 1, wherein the user interface includes
a speaker configured to play the audio stream, and
a display configured to display an indication that the away mode of the intercom device is set.

6. The intercom device according to claim 5, wherein the display includes a graphical user interface and the indication of the away mode of the intercom device includes an icon displayed on the graphical user interface.

7. An intercom device for transmitting an audio stream, the intercom device comprising:
a user interface including an input mechanism;
a memory; and
an electronic processor communicatively coupled to the user interface and the memory, the electronic processor configured to
transmit an audio stream to another intercom device;
receive an away signal from the another intercom device indicating that the another intercom device is in an away mode;
receive a user-selectable entry from the input mechanism; and
transmit a record signal to the another intercom device in response to the user-selectable entry that causes the another intercom device to record the audio stream.

8. The intercom device according to claim 7, wherein the electronic processor is further configured to transmit a call signal to the another intercom device prior to transmitting the audio stream, the call signal initiating communication with the another intercom device.

9. The intercom device according to claim 8, wherein the electronic processor is further configured to receive an away signal indicating that the another intercom device is in the away mode when the away mode is set and the call signal is transmitted.

10. The intercom device according to claim 7, further comprising a display, and wherein the electronic processor is further configured to generate an indication of the away mode of the another intercom device on the display when the away signal is received.

11. The intercom device according to claim 10, wherein the display of the intercom device includes a graphical user interface and the indication of the away status includes an icon displayed on the graphical user interface.

12. The intercom device according to claim 7, wherein the input mechanism includes a plurality of multi-position switches that are each configured to select one of a plurality of intercom devices.

13. The intercom device according to claim 7, wherein the electronic processor is further configured to simultaneously receive one entry selecting the another intercom device and another entry selecting a request to record the audio stream during transmission of the audio stream.

14. A method of recording an audio stream at a first intercom device, the method comprising:
receiving a first user-selectable entry from a first input mechanism of the first intercom device;
setting an away mode of the first intercom device in response to the first user-selectable entry;
receiving call signal from a second intercom device, the call signal initiating a call to the first intercom device;
sending, from the first intercom device to the second intercom device, an away signal indicating that the first intercom device is set to the away mode;
receiving a second user-selectable entry from a second input mechanism of the second intercom device;
transmitting an audio stream, from the second intercom device to the first intercom device, in response to the second user-selectable entry;
transmitting a record signal, from the second intercom device to the first intercom device, in response to the second user-selectable entry, the record signal causing the first intercom device to record the audio stream; and
recording the audio stream in a memory of the first intercom device in response to the record signal.

15. The method of recording the audio stream according to claim 14, the method further comprising: generating an indication of the away mode of the first intercom device on a first display of the first intercom device and on a second display of the second intercom device.

16. The method of recording the audio stream according to claim 15, wherein generating the indication of the away mode of the first intercom device includes displaying an icon on a first graphical user interface of the first display and displaying another icon on a second graphical user interface of the second display.

17. The method of recording the audio stream according to claim 14, wherein receiving the second user-selectable entry from the second input mechanism includes receiving a selection from one of a plurality of multi-position switches, each of the plurality of multi-position switches being configured to select one of a plurality of intercom devices for transmission, and wherein each of the multi-position switches is a three- or five-position switch.

18. The method of recording the audio stream according to claim 14, wherein receiving the second user-selectable entry from the second input mechanism of the second intercom device includes receiving one entry selecting the first intercom device and another entry selecting a request to record the audio stream.

19. The method of recording the audio stream according to claim 18, wherein receiving one entry selecting the first intercom device and another entry selecting the request to record the audio stream are received simultaneously while transmitting the audio stream.

20. The method of recording the audio stream according to claim 14, wherein the first intercom device is directly coupled to the second intercom device.

* * * * *